Jan. 29, 1963     H. A. TOULMIN, JR     3,075,494
APPARATUS FOR MAKING METALLIZED POROUS REFRACTORY MATERIAL
Filed Feb. 19, 1960
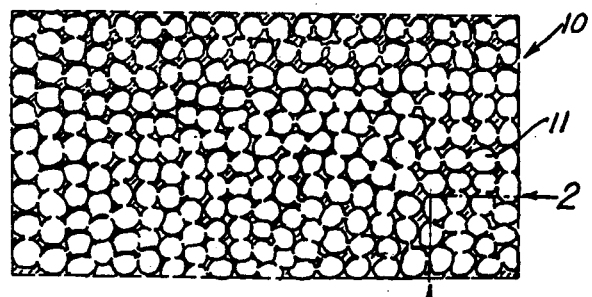
Fig.1
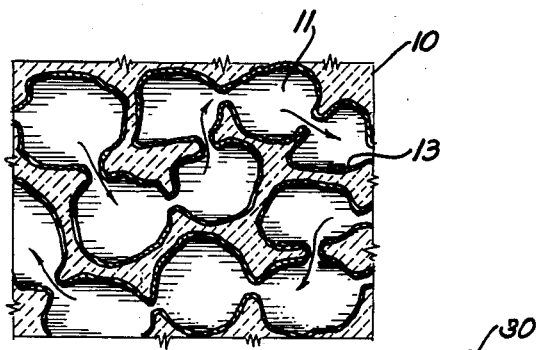
Fig.2
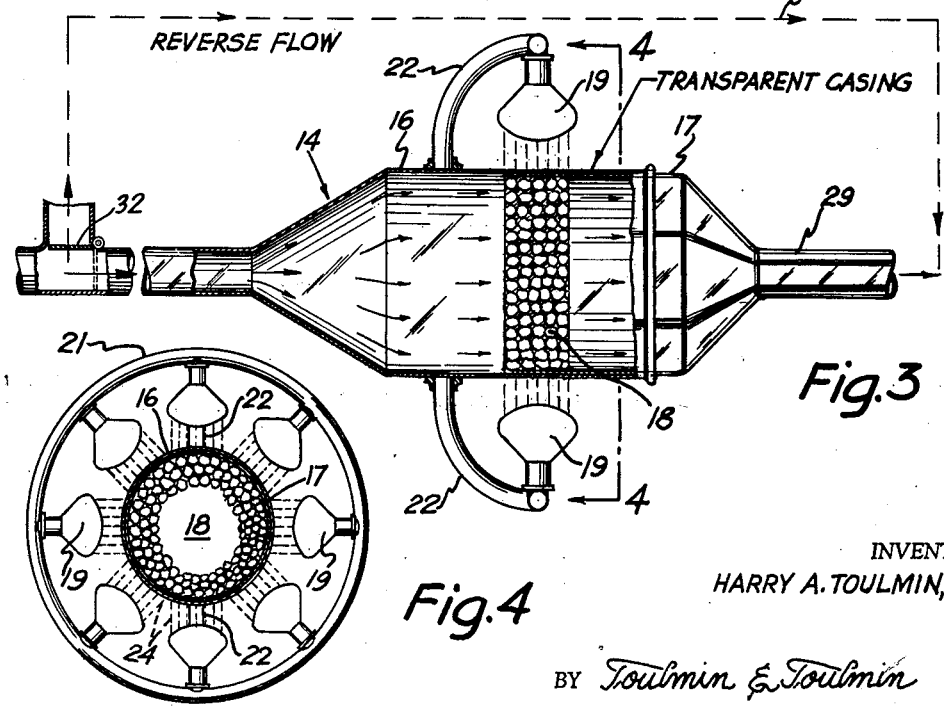
Fig.3
Fig.4
INVENTOR
HARRY A. TOULMIN, JR.
BY Toulmin & Toulmin
ATTORNEYS United States Patent Office 3,075,494
Patented Jan. 29, 1963

3,075,494
APPARATUS FOR MAKING METALLIZED
POROUS REFRACTORY MATERIAL
Harry A. Toulmin, Jr., Dayton, Ohio, assignor to Union
 Carbide Corporation, New York, N.Y.
Filed Feb. 19, 1960, Ser. No. 9,821
3 Claims. (Cl. 118—49.5)

This invention relates to the production of metallized porous ceramic material and wherein metal is plated onto the walls of the pores throughout the interior of the ceramic material.

It is an object of the invention to provide a foraminous ceramic such as fused silica, glass or the like, wherein the wall surfaces of the pores and interstices throughout the foraminous material are gas plated with metal.

Porous ceramic materials such as silica, bricks, cokes, silica gels and the like porous, spongy ceramic structures when treated in accordance with the process of this invention provide an article having an exceedingly large surface area of metal.

The gas plated ceramic products are useful in many arts. For example, as contact metal catalysts, high temperature bearings and which are required to retain lubricant. The metallized porous ceramic material also may be fabricated into friction linings, skids and antifriction articles which are required to withstand relatively high temperatures.

The product is also useful for the release of vapors of thermally decomposable metal bearing compounds, and such as employed in carrying out gas plating processes.

Other important uses are as barriers for atomic rays, and in fabricating sound and heat insulating walls and the like. Other uses comprise the application of the gas plated ceramic material to chemical apparatus, and for parts which are required to withstand high temperatures, and such as may be used in the fabrication of rockets, missiles and the like.

The gas plated foraminous ceramic material is also used as reflecting surfaces, as well as for heat shields in corrosive materials, and where it is necessary that metals be used which are non-corrosive.

The invention will be described in more particularity with respect to gas plated ceramics such as fused silica or porous glass articles.

The invention will be readily understood from the following description when taken in connection with the accompanying drawings, wherein:

FIGURE 1 illustrates a foraminous fused silica article which has been gas plated to provide walls of the porous material covered with metal;

FIGURE 2 illustrates a section taken substantially along the line 2—2 of FIGURE 1, which is drawn on a large scale and illustrating the foraminous structure and labyrinth passageways extending throughout the material and which has been gas plated with metal in accordance with applicant's invention;

FIGURE 3 illustrates gas plating apparatus for carrying out the metal plating of the foraminous ceramic material; and FIGURE 4 is a view taken substantially on the line 4—4 of FIGURE 3 and looking in the direction of the arrows.

Referring to the drawings in more detail, FIGURES 1 and 2 depict a ceramic porous glass material 10 having a capillary labyrinth inner wall porous structure 11, as best illustrated in FIGURE 2. The porous wall structure 11 is coated with a thin film of metal 13 as deposited by gas plating. The metal film or coating deposited forms an integral metal liner for the porous wall structure. To provide for uniform deposition of metal throughout the porous ceramic material, the same is heated to a uniform temperature and a metal bearing gas containing a decomposable gaseous metal compound is passed through the heated porous material. The porous material is heated to a temperature high enough to cause decomposition of the metal bearing compound and deposition of the metal on the inner wall surfaces throughout the body of the material, thus forming a foraminous, metallized article such as illustrated in FIGURE 2.

Ceramic porous materials of this character in which the walls of the pores or cavities throughout the body of the material are metallized, may be fabricated into any desired shape. Siliceous foraminous material such as made of foamed fused silica may be metallized to provide a porous metal structure.

Gas plating of the ceramic material may be carried out utilizing the apparatus illustrated in FIGURE 3. This arrangement comprises a plating chamber 14 having transparent telescoping casing members 16 and 17. The casings preferably are made of heat-resistant glass, e.g., borosilicate glass such as Pyrex or clear plastic which is sufficiently stable at the temperature of gas plating. The porous ceramic article to be gas plated, such as shown at 18, is positioned in the inner telescoping casing 17, being positioned centrally of the gas plating chamber, as shown at FIGURE 3. For heating the porous article 18, infra-red lamps 19 are arranged circumferentially of the gas plating chamber, as illustrated in FIGURE 3. Lamps 19 are spacedly positioned on a collar or ring 21 which is supported on the outer walls of the casing 16 by the arcuate shaped arms 22, as shown in FIGURE 4. Infra-red rays from lamps 19 pass through the transparent walls of the gas plating chamber and are focused on the porous ceramic article, as depicted by the dotted lines 24 in FIGURE 4. In this manner the porous ceramic article is heated to an even, uniform temperature throughout the interior of the porous ceramic body.

The gas plating is carried out under controlled conditions to deposit metal to a uniform thickness on the porous walls. Thermally decomposable metal bearing gases along with an inert carrier gas is introduced in the gas plating chamber 14 and flows through the porous article 18, as illustrated by the arrows 24 in FIGURE 3. Exhaust gases from the plating chamber are discharged at the opposite end of the plating chamber and thence to conduit 29. For effectively coating the porous article, a reversal flow of the metal bearing gases is provided for, as indicated by the arrow at 30 in FIGURE 3. A conventional two-way flap valve 32 is provided for this purpose which is adjustable to direct the flow of gas in the desired direction.

In carrying out the gas plating, air is evacuated from the gas plating chamber 14, use being made of a vacuum pump, not shown, or by expelling the air under pressure of inert gas which is flushed through the gas plating chamber. The inert gas useful as a carrier gas may comprise helium, nitrogen, argon and the like. Carbon dioxide may also be used as a carrier gas where the same is not detrimental to the plating operation. During the gas plating of the directional flow of metal bearing gases is reversed every 3 to 5 minutes so that a uniform coating of metal is deposited on the walls of the pores and cavities throughout the body of the material.

The amount of metal deposited in a given time may be controlled to form a metal deposit of the desired thickness. Metal deposits of from .001 to .01 of an inch thickness are readily obtained in accordance with this process, use being made of the metal carbonyls or other heat decomposable metal bearing compounds. Metallized porous glasses having fine-grained pore structures permit low machining tolerances, for example plus or minus 0.001 inch.

The following are typical examples of gas plated foraminous, ceramic material:

Example I

A porous fused silica slab approximately six inches in thickness by 12 inches in length having pores of approximately 0.01 inch in diameter is subjected to gas plating using nickel carbonyl in helium carrier gas. The porous slab is heated to a temperature of 350° F., which temperature is maintained throughout the gas plating operation. A gaseous stream of nickel carbonyl and helium was passed through the gas plating chamber and through the foraminous ceramic material for a period of five minutes to metallize the pore walls.

In order to provide a uniform coating of metal throughout the foraminous material, the metal bearing gas is passed through the foraminous ceramic material in one direction for approximately five minutes and then reversed and passed through the ceramic article in the opposite direction. A metal coating of substantially uniform thickness is deposited on the walls of the pores or cavities throughout the body of the material.

Deposition of nickel metal to a thickness of 0.01 to 0.10 inch or greater is desirable. Use may be made, however, of different heat-decomposable metal bearing compounds such as described, depending upon the metal to be deposited.

Example II

In this example a foraminous Pyrex glass article, having pores or cavities on the order of 0.1 inch in diameter is gas plated with chromium using chromium carbonyl in a nitrogen gas carrier. The method was carried out similarly to Example I to deposit chromium metal on the walls of the pores throughout the ceramic material.

Example III

In this instance, aluminum metal was plated onto porous ceramic slab as in Example I, using aluminum isobutyl and wherein the inert gas was helium, the article being gas plated with aluminum metal in a vacuum chamber by withdrawing the air and introducing the mixture of aluminum isobutyl and the helium carrier gas.

In carrying out the gas plating, use may be made of heat-decomposable gaseous metal carbonyls as described, or vaporized solutions of certain of the metal carbonyls may be employed. For example, metal carbonyls dispersed in readily vaporizable solvents such as petroleum ether may be used.

Illustrative compounds of the carbonyl type which are useful are nickel, copper, iron, chromium carbonyls and mixed carbonyls of these metals. Other useful substitute heat-decomposable compounds are the nitroxyls, such as copper nitroxyl, nitrosyl carbonyls, for example, cobalt nitrosyl carbonyl; and hydrides, e.g. antimony hydride, tin hydride; also metal alkyls, magnesium diethyl and carbonyl halogens, for example, osmium carbonyl bromide, ruthenium carbonyl chloride, and the like. Vaporizable metal compounds in the form of chlorides, bromides or iodides may be used, as well as metallic salts of organic radicals having less than six carbon atoms, e.g., tetraethyl tin, nickel or copper acetylactones and the like. Metallic halides may be obtained from sea water or formed as a by-product in processes utilizing brine-containing waters.

Each compound from which a metal may be plated out has a temperature at which decomposition is complete. However, decomposition may take place slowly at lower temperature while the vapors are being raised through some particular range. For example, nickel carbonyl completely decomposes at a temperature in the range of 375° F. to 400° F. However, nickel carbonyl starts to decompose slowly at about 175° F. and, therefore, decomposition continues during the time of heating from 200° F. to 380° F. A large number of the metal carbonyls and hydrides may be effectively and efficiently decomposed at a temperature in the range of 350° F. to 450° F. When working with most metal carbonyls it is preferred to operate in a temperature range of 375° F. to 425° F.

In the gas plating of porous ceramic materials in accordance with this invention, it is generally preferable to first flush out the gas plating chamber with hydrogen gas to reduce any foreign metal particles and remove any oxides present. While the porous ceramic material is positioned in the gas plating chamber, the metal bearing gas and carrier medium is introduced into the gas plating chamber and drawn through the labyrinth of porous structure to effect the gas plating.

The invention is adapted for gas plating various foraminous ceramic materials and especially porous ceramics which have inner communicating pores throughout the mass, thus permitting the metal bearing vapors to be conducted through the porous ceramic material. In accordance with applicant's invention, such foraminous ceramic material may be gas plated with one or more metals depending upon the ultimate use of the product and the temperatures to which the products are to be subjected and used.

Where it is desired to improve the physical adherence of the metal film or coating onto the ceramic substrate surface, the gas plated material is subject to heat treatment; for example, the gas plated foraminous ceramic material may be heated to a temperature of approximately 500° F. for one hour which improves the adherence of the metal and diffuses it into the glass or ceramic material. The invention is adapted for gas plating various fired ceramics and permits the use of relatively high temperature thermally decomposing metal bearing gases. Further, where the pores and openings in the ceramic material are of a small size, e.g. micron one or less, the gas plating operation is carried out under sufficient pressure to force the metal bearing gas through the porous material. The pressure employed, in each instance, will vary depending upon the size of the pores and the thickness of the foraminous ceramic material being gas plated. For example, gas plating fused silica slabs of 1″ thickness with pores of 0.01 to 0.1 inch in diameter, the pressure of the metal bearing gas may be raised above atmosphere, e.g., 10 to 20 pounds/sq. inch gage. The higher the pressure, the more rapid the gas plating can be carried out to effect the metal deposition onto the walls of the foraminous ceramic material. Preferably, the ceramic article is of a porosity such that the pressure of the metal bearing gas flowing through the gas plating chamber is only five to ten pounds above atmospheric pressure. Less than atmospheric pressure may be used where the porosity of the material being gas plated permits satisfactory metal deposits to be obtained. The larger the pores or cavities in the body of the ceramic material, the less pressure is needed to effectively metallize the foraminous ceramic material.

While a preferred procedure and suitable apparatus has been described for carrying out the invention, it is to be clearly understood that the same is not to be restricted thereto, as various changes and modifications may be made therefrom by those skilled in the art without departing from the spirit and scope of this invention and as more particularly set forth in the appended claims.

What is claimed is:

1. An apparatus for making metallized porous refractory material which comprises a gas plating chamber composed of telescoping casings, each of said casings having transparent side walls, means for supporting a porous ceramic body in said gas plating chamber, and means comprising a plurality of infra-red lamps disposed circumferentially about said gas plating chamber and focused on said porous ceramic body disposed in the gas plating chamber.

2. An apparatus for making metallized porous refractory material which comprises a gas plating chamber composed of telescoping casings, each of said casings having transparent side walls, means for supporting a porous ceramic body in said gas plating chamber, means for passing a thermally decomposable metal bearing gas through said plating chamber and said porous ceramic body, and means comprising a plurality of infra-red lamps disposed circumferentially about said gas plating chamber and focused on said porous ceramic body disposed in the gas plating chamber, the gas plating chamber being provided with means for reversing the flow of thermally decomposable metal bearing gases therethrough.

3. An apparatus for making metallized porous refractory material which comprises a gas plating chamber composed of telescoping casings, each of said casings having transparent side walls, means for supporting a porous ceramic body in said gas plating chamber, means for passing a thermally decomposable metal bearing gas through said plating chamber and said porous ceramic body, and means comprising a plurality of infra-red lamps disposed circumferentially about said gas plating chamber in spaced relationship and focused on said porous ceramic body disposed in the gas plating chamber.

References Cited in the file of this patent
UNITED STATES PATENTS

| | | |
|---|---|---|
| 2,698,812 | Schladitz | Jan. 4, 1955 |
| 2,847,319 | Marvin | Aug. 12, 1958 |
| 2,918,392 | Beller | Dec. 22, 1959 |